(12) United States Patent
Reese

(10) Patent No.: US 9,774,195 B1
(45) Date of Patent: Sep. 26, 2017

(54) SYSTEMS AND METHODS FOR PROVIDING CONDUCTIVE CHARGING WITH MULTIPLE TERMINAL CONSTELLATIONS

(71) Applicant: Sears Brands, L.L.C., Hoffman Estates, IL (US)

(72) Inventor: Brian Todd Reese, St. Charles, IL (US)

(73) Assignee: SEARS BRANDS, L.L.C., Hoffmann Estates, IL (US)

( * ) Notice: Subject to any disclaimer, the term of this patent is extended or adjusted under 35 U.S.C. 154(b) by 0 days.

(21) Appl. No.: 15/355,551

(22) Filed: Nov. 18, 2016

Related U.S. Application Data

(60) Provisional application No. 62/402,520, filed on Sep. 30, 2016.

(51) Int. Cl.
*H02J 7/00* (2006.01)
(52) U.S. Cl.
CPC ............ *H02J 7/0021* (2013.01); *H02J 7/007* (2013.01); *H02J 7/0044* (2013.01)
(58) Field of Classification Search
CPC ....................................... H02J 7/0021
USPC ........................................ 320/108; 307/104
See application file for complete search history.

(56) References Cited

U.S. PATENT DOCUMENTS

| | | | |
|---|---|---|---|
| 2006/0164038 A1* | 7/2006 | Demers ................. | H02J 7/0014 320/116 |
| 2007/0194526 A1 | 8/2007 | Randall | |
| 2009/0278494 A1* | 11/2009 | Randall ................. | H02J 7/0044 320/114 |
| 2009/0302801 A1* | 12/2009 | Katsunaga .......... | B60L 11/1816 320/109 |
| 2013/0193906 A1* | 8/2013 | Yu ......................... | H02J 7/0068 320/103 |

* cited by examiner

*Primary Examiner* — Drew A Dunn
*Assistant Examiner* — Zixuan Zhou
(74) *Attorney, Agent, or Firm* — McAndrews, Held & Malloy, Ltd.

(57) ABSTRACT

A system and method for charging battery packs is provided. The system and method provides constellation/dots style conductive charging having multiple terminal constellations for one or both of providing redundancy in the case of dirty or non-working contacts and providing a voltage/amperage divide for handling higher voltage and/or increased capacity battery packs.

19 Claims, 10 Drawing Sheets

US 9,774,195 B1

SYSTEMS AND METHODS FOR PROVIDING CONDUCTIVE CHARGING WITH MULTIPLE TERMINAL CONSTELLATIONS

CROSS-REFERENCE TO RELATED APPLICATIONS/INCORPORATION BY REFERENCE

The present application claims priority under 35 U.S.C. §119(e) to provisional application Ser. No. 62/402,520, filed on Sep. 30, 2016. The above referenced provisional application is hereby incorporated herein by reference in its entirety.

FIELD

Certain embodiments of the invention relate to battery packs. More specifically, certain embodiments of the present invention relate to battery packs that implement constellation/dots style conductive charging having multiple terminal constellations for one or both of providing redundancy in the case of dirty or non-working contacts and providing a voltage/amperage divide for handling higher voltage and/or increased capacity battery packs.

BACKGROUND

Constellation/dots style conductive charging is a charging technology that relies on the contact between small metallic ball tips on a battery and charged metallic strips on a charger. Existing conductive charging technology has been implemented in cellphones, tablets, and consumer electronics, for example. Constellation/dot style conductive charging has not yet been commercially implemented on power tools due to a number of challenges. For example, conductive charging may not operate properly in a garage, outdoor, and construction site environment that power tools are subjected to because the contacts of the charging device may get dirty. If a ball tip were to get dirty, sufficient electrical contact may not be made between the two elements.

As another example, power tool batteries continue to increase in both voltage and capacity; however, conductive charging pads are typically set to be charged at low voltage to reduce the risk of user injury. With this low voltage pad surface requirement, the system is forced into a number of compromises. First, higher voltage/capacity batteries may require a higher voltage differential or amperage draw than the small ball tips are capable of conducting due to the limited contact area. Second, additional circuitry is typically needed within the battery pack for higher voltages to step up the voltage so that the battery can be charged.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method that provides constellation/dots style conductive charging having multiple terminal constellations for one or both of providing redundancy in the case of dirty or non-working contacts and providing a voltage/amperage divide for handling higher voltage and/or increased capacity battery packs, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Aspects of the present disclosure are related to systems and methods for charging battery packs. More specifically, certain embodiments relate to systems and methods that provide constellation/dots style conductive charging having multiple terminal constellations for one or both of providing redundancy in the case of dirty or non-working contacts and providing a voltage/amperage divide for handling higher voltage and/or increased capacity battery packs.

A representative embodiment of the present disclosure provides multiple sets of the ball tip constellations on a battery, power tool, or other device. The ball tip constellations may provide either redundancy in the case of a dirty contact and/or a voltage/amperage divide in the case of the larger packs. For example, by duplicating the dot sets the risk of a device not charging when on a charging pad due to faulty, dirty, or damaged dot constellations is reduced. As another example, by adding additional dot sets, the current can be divided by the number of dot sets thus decreasing it to a reasonable range without increasing the charge time required. Additionally and/or alternatively, adding multiple constellations to the device provides options for positioning or placing the device on a charging pad. For example, dots/constellation on the top surface and bottom surface of the device enable the device to be placed on a charging mat without regard to which surface is touching the pad, since both surfaces have constellations. In various embodiments, the battery pack may be broken down into smaller groups of cells at lower series sum voltages to enable charging pad voltage to remain lower than the total series sum voltage of the multi-cell battery pack. The broken down battery pack addresses the safety issue of retaining low voltage surfaces on the charging pad and eliminates the need for modulating voltage up to a level needed to charge higher series sum battery voltages.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
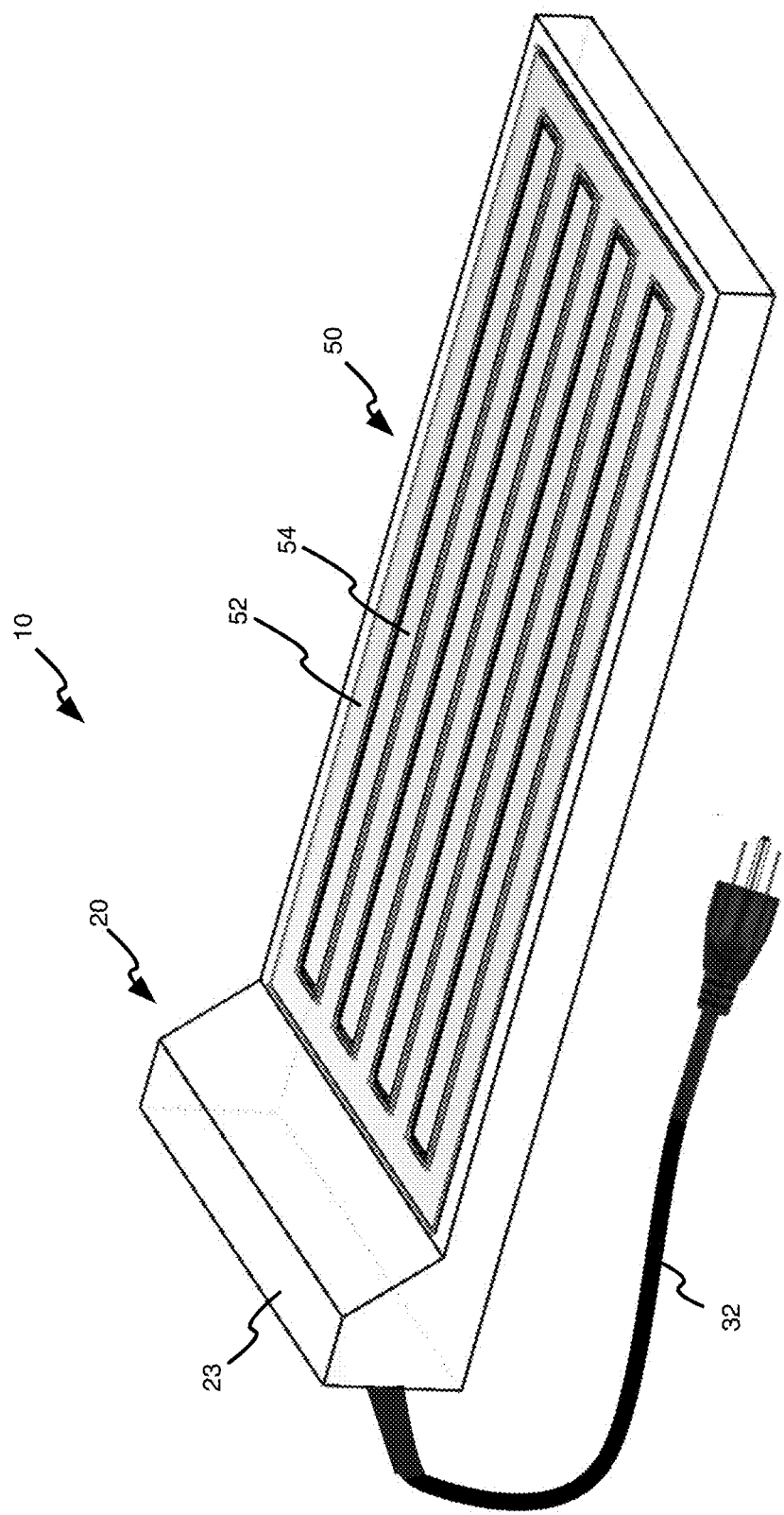
FIG. 1 provides a perspective view of an exemplary charging pad of a battery charging system, in accordance with a representative embodiment of the present disclosure.
Figure 2:
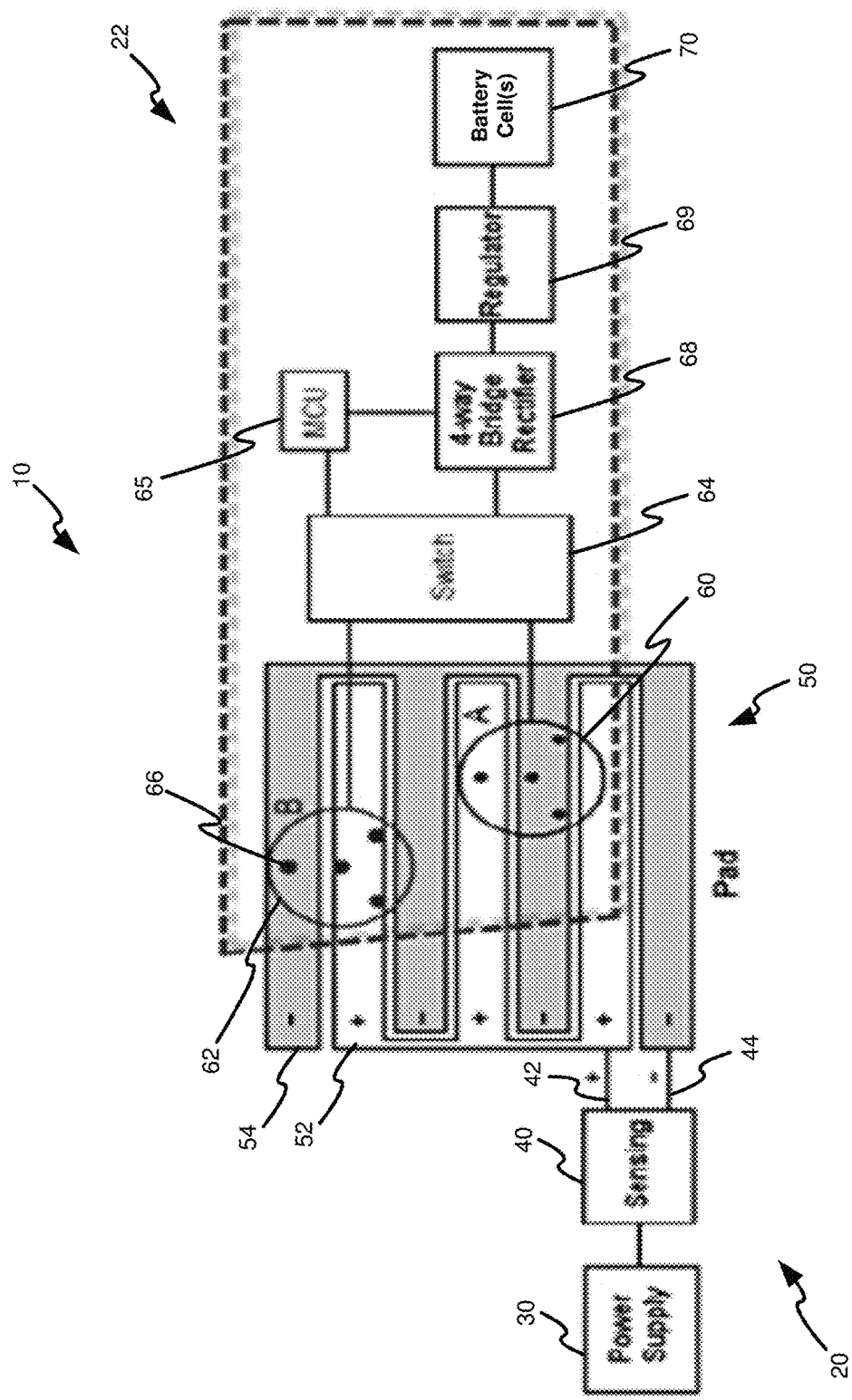
FIG. 2 is a block diagram of an exemplary battery charging system including a charging pad and a rechargeable device having multiple terminal constellations, in accordance with a representative embodiment of the present disclosure.

FIG. 1 provides a perspective view of an exemplary charging pad 20 of a battery charging system 10, in accordance with a representative embodiment of the present disclosure. FIG. 2 is a block diagram of an exemplary battery charging system 10 including a charging pad 20 and a rechargeable device 22 having multiple terminal constellations 60, 62, in accordance with a representative embodiment of the present disclosure. Referring to FIGS. 1 and 2, the system 10 includes a charging pad 20 and a rechargeable device 22. The charging pad 20 may comprise an AC power supply 30, a sensing circuit 40, and a charging pad surface 50. The rechargeable device 22 may include multiple terminal constellations 60, 62, a switch 64, a microcontroller unit (MCU) 65, a rectifier 68, a regulator 69, and one or more rechargeable battery cells 70. The power supply 30 may receive power from an AC wall outlet via a power cord 32. Moreover, the power supply 30 may be housed within a casing or housing 23 of the charging pad 20. Encasing the power supply 30 within the housing 23 may help protect the power supply from harsh environments. Furthermore, such encasing may increase usability and convenience since a user of such a charging system 10 is not required to handle and maintain an external power supply.

The sensing circuit 40 may condition power provided by the power supply 30 and provide such conditioned power to electrodes 52, 54 of the charging pad surface 50. The electrodes 52, 54 may comprise metal strips on the charging pad surface 50 that are respectively coupled to positive and negative terminals 42, 44 of the sensing circuit 40. The multiple terminal constellations 60, 62 of the rechargeable device 22 may each have a pattern of connection or contact points 66, such as small metallic ball tips or any suitable contact point. In particular, the electrodes 52, 54 and the contact points 66 of the constellations 60, 62 are geometrically arranged such that at least one contact point 66 of each constellation 60, 62 contacts the positive electrode 52 of the charging pad surface 50 and at least one contact point 66 of each constellation 60, 62 contacts the negative electrode 54 of the charging pad surface 50 irrespective of where each of the constellations 60, 62 is placed on the charging pad surface 50. In this manner, the contact points 66 of each of the terminal constellations 60, 62 make a direct electrical connection to the electrodes 52, 54 when placed on the charging pad surface 50.

In various embodiments, the multiple terminal constellations 60, 62 may be wired together inside the rechargeable device 22. Additionally and/or alternatively, a switch 64 may select the terminal constellation 60, 62 from which to charge the rechargeable device 22. The microcontroller unit 65 may include a processor and a memory that is in communication with the processor. The processor may execute instructions stored in the memory to determine the connection strategy and control the switch 64. The switch 64 may provide charge signals received from one or more of the multiple terminal constellations 60, 62 to the rectifier 68, such as a four-way bridge rectifier. Because it is not possible to know which contact point(s) 66 of each of the constellations 60, 62 will contact the positive electrode 52 and which contact point(s) 66 of each of the constellations 60, 62 will contact the negative electrode 54, the rectifier 68 may be used to receive power signals from the contact point(s) 66 with an unknown polarity and provide the regulator 69 with power signals of a desired polarity. The regulator 69 may regulate the power received from the rectifier 68 and provide the regulated output to the rechargeable battery cells 70.

Figure 3:
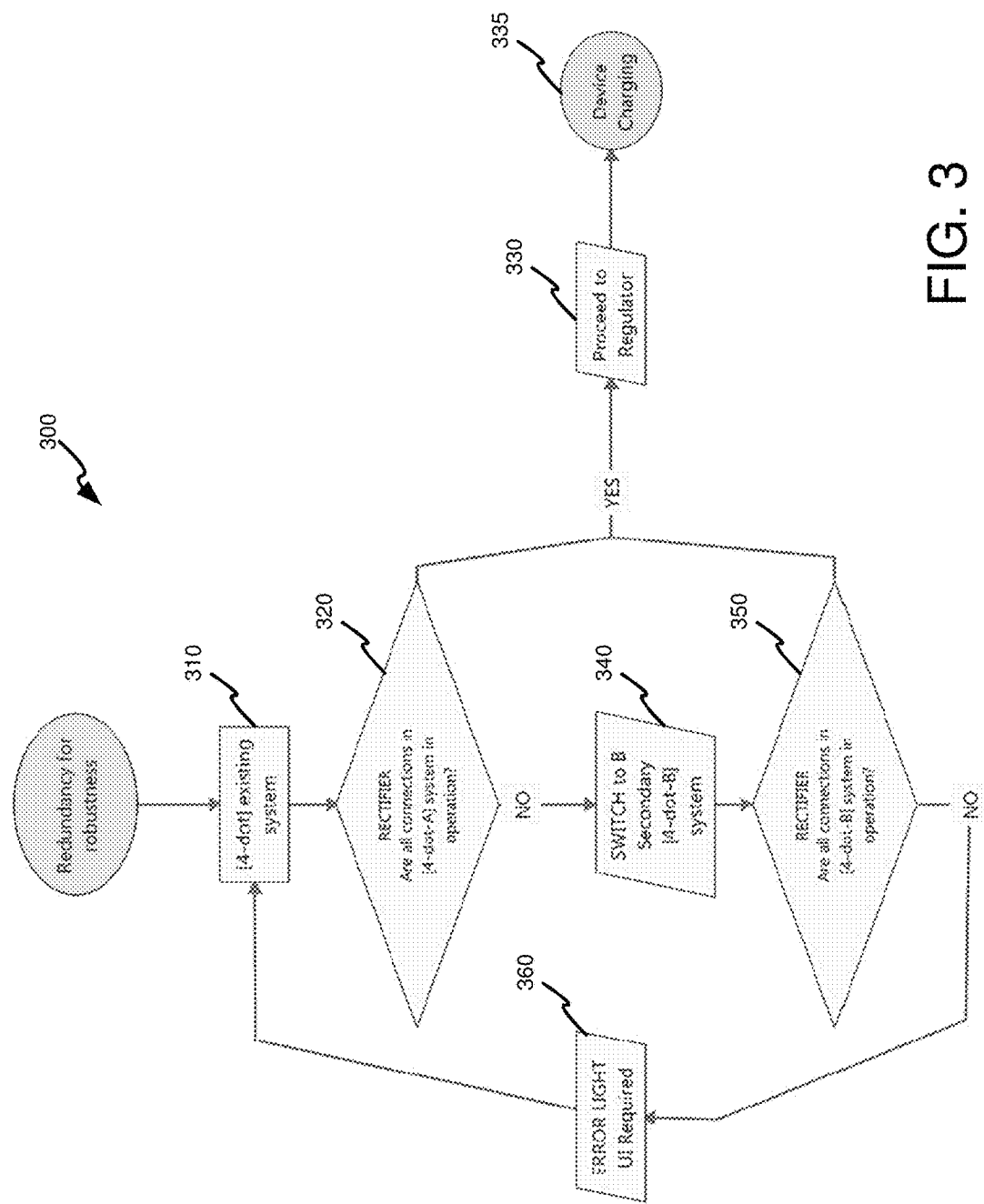
FIG. 3 is a flowchart illustrating an exemplary method for charging a battery of a device having multiple terminal constellations, in accordance with a representative embodiment of the present disclosure.

FIG. 3 is a flowchart illustrating an exemplary method 300 for charging battery cells 70 of a rechargeable device 22 having multiple terminal constellations 60, 62, in accordance with a representative embodiment of the present disclosure. The actions 310-360 of the method 300 of FIG. 3 may be performed using elements of the system 10 illustrated in FIGS. 1 and 2 including, for example, the power supply 30, the sensing circuit 40, the charging pad surface 50, the multiple terminal constellations 60, 62, the switch 64, the microcontroller unit 65, the rectifier 68, the regulator 69, and the rechargeable battery cell(s) 70. The system 10 may be arranged to provide redundancy, for example. Certain embodiments may omit one or more of actions, and/or perform the actions in a different order than the order listed, and/or combine certain of the actions discussed below. For example, some actions may not be performed in certain embodiments of the present disclosure. As a further example, certain actions may be performed in a different temporal order, including simultaneously, than listed below.

Initially, multiple terminal constellations 60, 62 of a rechargeable device 22 may be placed on the charging pad surface 50 to make a direct electrical connection between the contact points 66 of the multiple terminal constellations 60, 62 and the pad electrodes 52, 54. The multiple terminal constellations 60, 62 may comprise a primary terminal constellation set and a secondary redundant terminal constellation set. The switch 64 may be controlled by the microcontroller unit 65 to receive a charging signal(s) from the primary terminal constellation set.

Next, the switch 64 at 310 may provide the received charging signal(s) to the rectifier 68. The microcontroller unit 65 at 320 may monitor the rectifier 68 to determine whether the contact points 66 of the primary terminal constellation set are operational. If the contact points 66 of the primary terminal constellation set are operational, the rectifier 68 at 330 may right the polarity of the received charging signal(s) and may provide the positive and negative power signals to the regulator 69. The regulator 69 at 335 may then charge the rechargeable battery cells 70 with its regulated output.

If the contact points 66 of the primary terminal constellation set are not operational, the microcontroller unit 65 at 340 may control the switch 64 to receive charging signal(s) from the secondary redundant terminal constellation set. Then, the switch 64 may provide the charging signal(s) from the secondary redundant terminal constellation set to the rectifier 68. The microcontroller unit 65 at 350 may monitor the rectifier 68 to determine whether the contact points 66 of the secondary redundant terminal constellation set are operational. If the contact points 66 of the secondary redundant terminal constellation set are operational, the rectifier 68 at 330 may right the polarity of the charging signal(s) and may provide the positive and negative power signals to the regulator 69. The regulator 69 at 335 may then charge the rechargeable battery cells 70 with its regulated output. If the contact points 66 of the secondary redundant terminal constellation set are not operational, the microcontroller unit 65 at 360 may provide a notification. For example, the microcontroller unit 65 may illuminate an error light, may sound an alarm, or may display a message, among other things, in order to notify a user that the charging system 10 is not operational.

Figure 4:
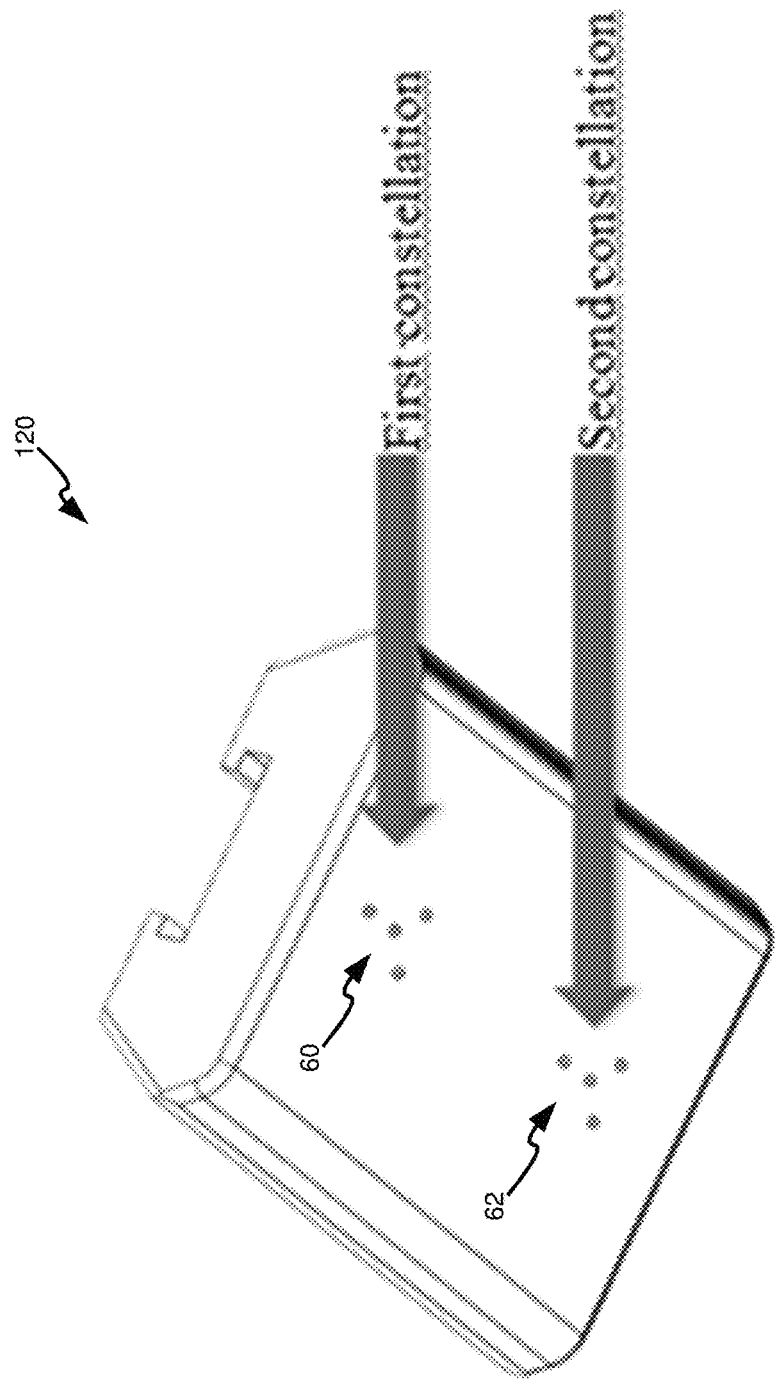
FIG. 4 is a bottom perspective view of an exemplary battery pack having multiple terminal constellations, in accordance with a representative embodiment of the present disclosure.

FIG. 4 is a bottom perspective view of an exemplary battery pack 120 having multiple terminal constellations 60, 62, in accordance with a representative embodiment of the present disclosure. As illustrated in FIG. 4, first and second dot constellation sets 60, 62 are provided for convenience.

Figure 5:
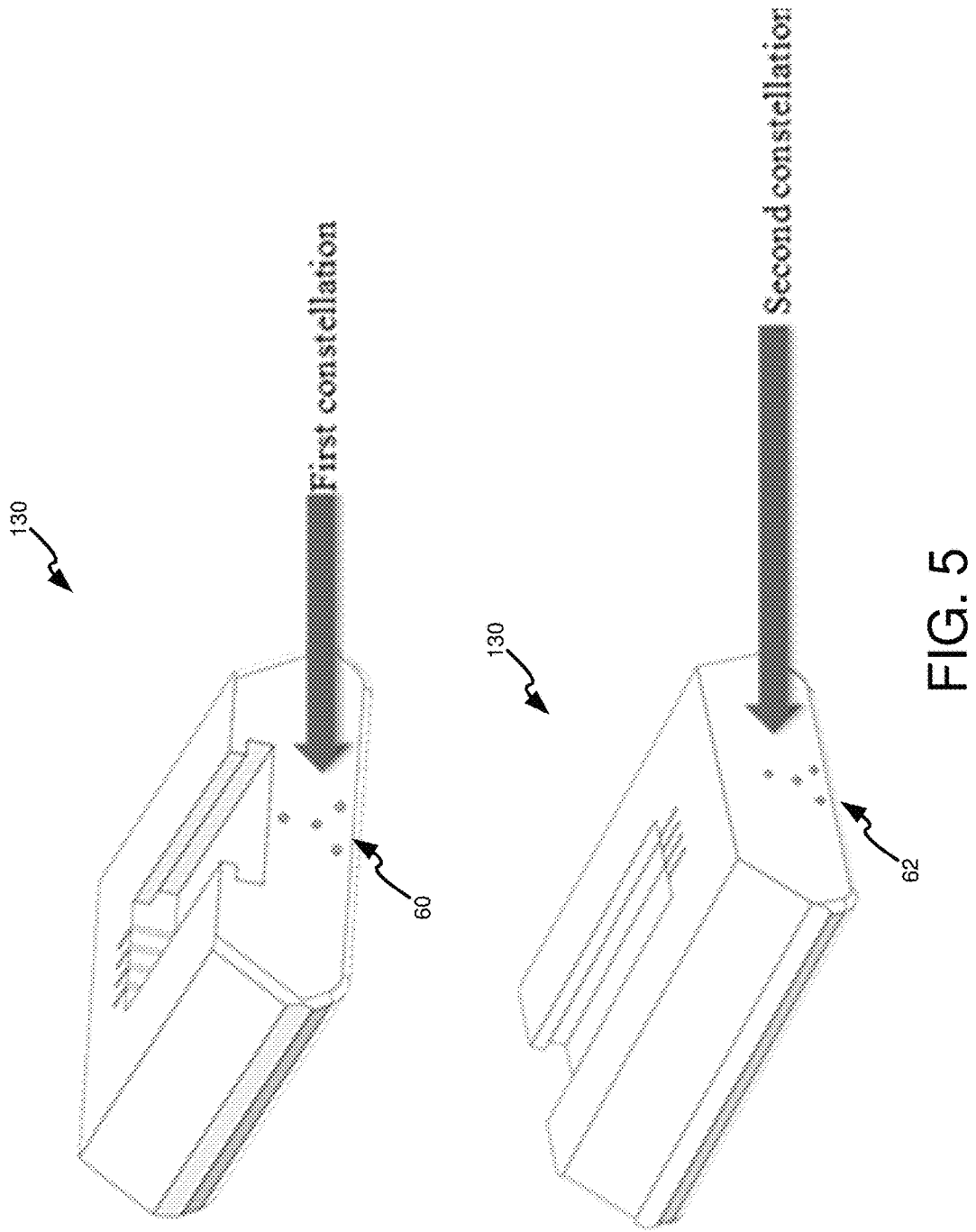
FIG. 5 illustrates front and rear perspective views of an exemplary battery pack having multiple terminal constellations, in accordance with a representative embodiment of the present disclosure.

FIG. 5 illustrates front and rear perspective views of an exemplary battery pack 130 having multiple terminal constellations 60, 62, in accordance with a representative embodiment of the present disclosure. Referring to FIG. 5, one or more terminal constellations 60, 62 may be provided, for example, on a front and a rear of the battery pack 130. In various embodiments, depending on the geometry of the battery pack 130, additional dot sets may be provided on different faces of the battery pack 130 so that each of the different faces of the battery pack 130 may be placed on the charging pad surface 50 in a manner that electrically connects respective contact points 66 to electrodes 52, 54 of the charging pad surface 50.

Figure 6:
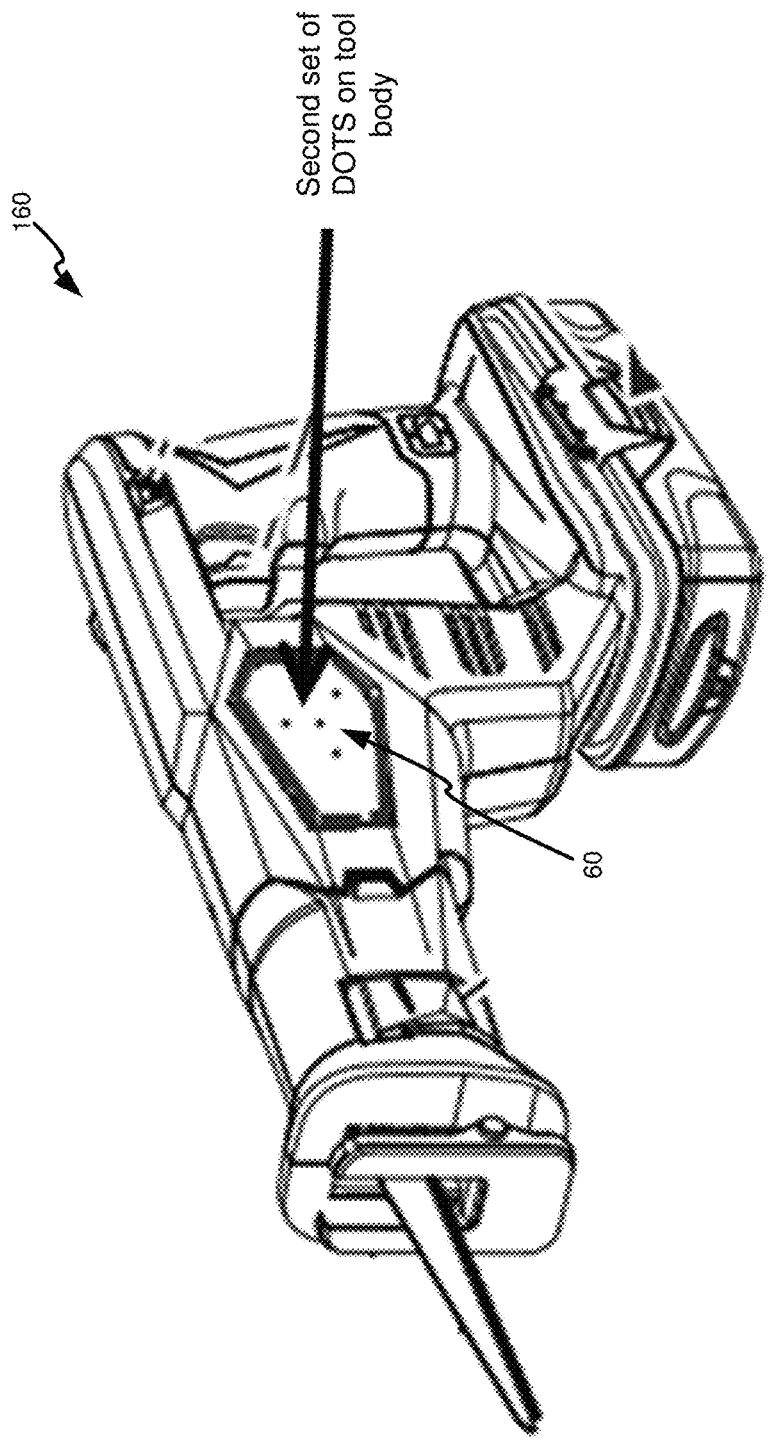
FIG. 6 is a perspective view of an exemplary power tool having multiple terminal constellations, in accordance with a representative embodiment of the present disclosure.

FIG. 6 is a perspective view of an exemplary power tool 140 having multiple terminal constellations 60, in accordance with a representative embodiment of the present invention. As illustrated in FIG. 6, one or more terminal constellations 60 may be placed on a device itself, such as a power tool 140 or any suitable device. An advantage of providing one or more terminal constellations on the battery is that the battery does not have to be removed from the tool 140 when charging. However, depending on the geometry of the tool 140, it may be difficult or inconvenient to place the battery down on the charging pad surface 50 when still connected to the tool 140, such as the reciprocating saw shown in FIG. 6, for example. In this case, various embodiments provide one or more sets of contact points 66 on a face of the tool body which may be more convenient. As described above with reference to FIGS. 1 and 2, the additional set(s) of dots may be wired directly to the primary set in the rechargeable device 22 or wired through a switch 64 that selects the appropriate constellation set depending on the situation, and the connection strategy could be controlled by the microcontroller unit 65 using alternative logic.

In various embodiments, multiple terminal constellations may be implemented on higher voltage batteries in a number of ways, which all provide the advantage of having lower voltage or amperage at each contact point of each of the multiple terminal constellations. In an exemplary embodiment, the battery cells within the battery pack may be divided into charging groups. For example, a battery pack containing four cells (e.g., ~4v each, connected in series to create ~16V) could have two charging groups of two cells each (e.g., ~8v total per two cells). Each charging group may have a dedicated dot set which would connect to the charging pad. There may be a switch inside the battery pack to decouple the charging groups from each other while the battery is charging and the connection strategy could be controlled by a microprocessor using alternative logic because the cells are typically internally wired in series. In this way, the series sum voltage is divided by two to 4v divisions since there are two charging groups and a more efficient and safe charging system is created compared to a system with a single dot set. In certain embodiments, a system having one dot set may switch between multiple charging groups. For example, with the two charging group example above, there could be two dot sets connected to the two battery sets. The dot sets would switch between two charging sets during the charging process.

Figure 7:
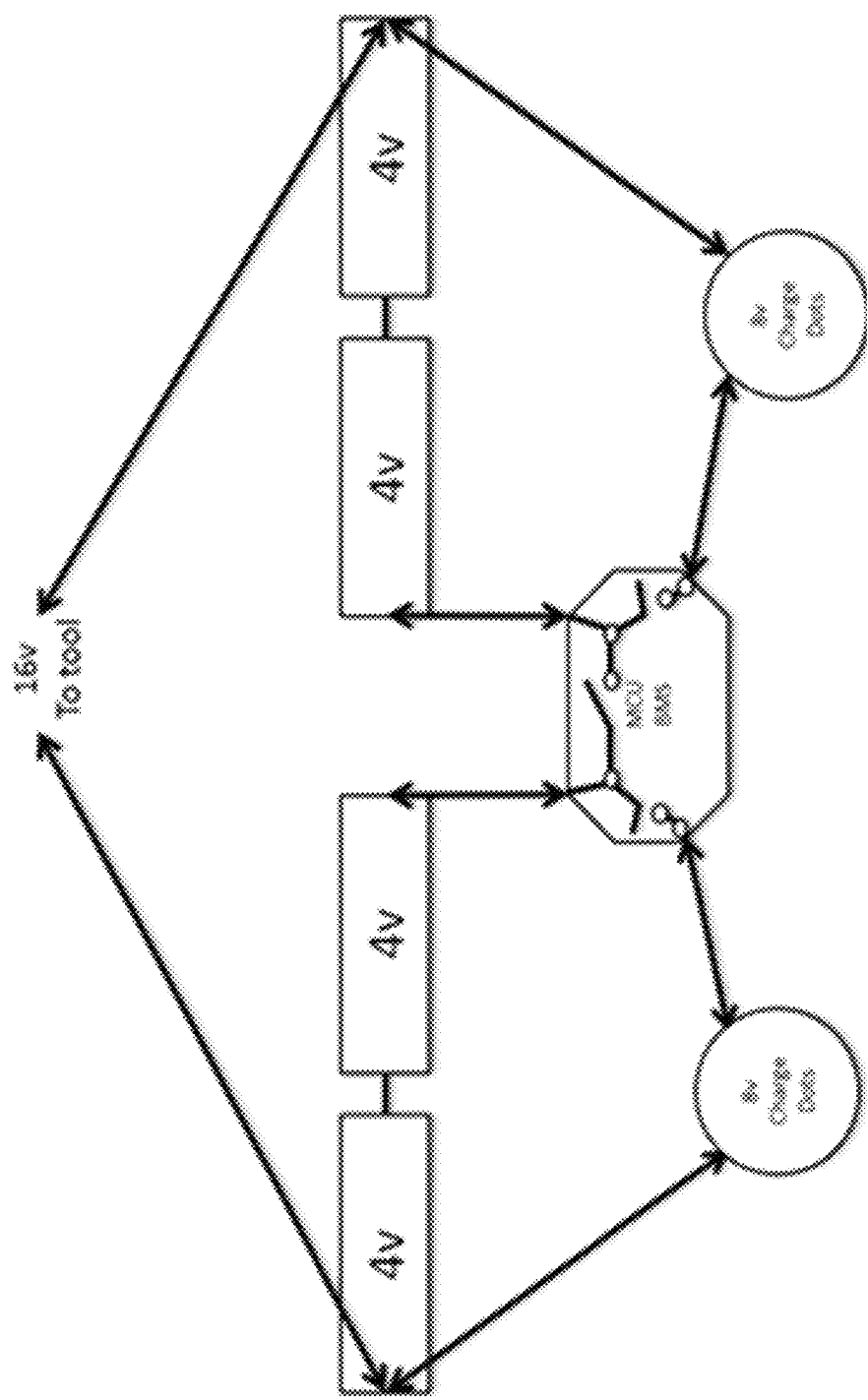
FIG. 7 is a block diagram of an exemplary battery charging system having two terminal constellations to split a charge voltage, in accordance with a representative embodiment of the present disclosure.

FIG. 7 is a block diagram of an exemplary battery charging system having two terminal constellations to split a charge voltage, in accordance with a representative embodiment of the present invention. Referring to FIG. 7, two sets of dots may be used to split the charge voltage. The microcontroller unit (MCU) as well as the Battery management system (BMS) in the battery pack can be switched based on charge versus discharge mode.

Figure 8:
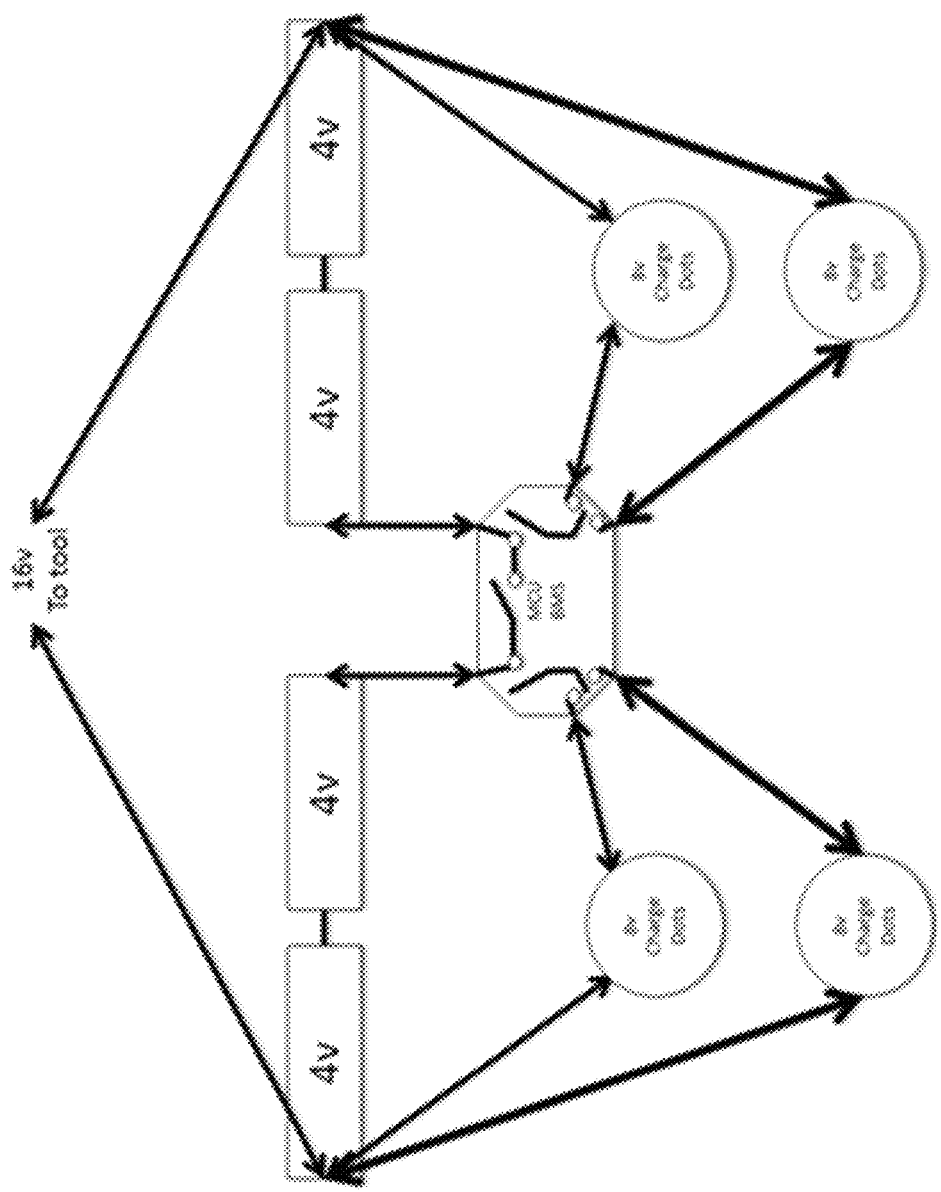
FIG. 8 is a block diagram of an exemplary battery charging system having two terminal constellations to split a charge voltage and two redundant terminal constellations, in accordance with a representative embodiment of the present disclosure.

FIG. 8 is a block diagram of an exemplary battery charging system having two terminal constellations to split a charge voltage and two redundant terminal constellations, in accordance with a representative embodiment of the present invention. Referring to FIG. 8, a first two sets of dots may be used to split the charge voltage and each of the first two sets of dots may have a separate redundant set of dots for reliability.

Figure 9:
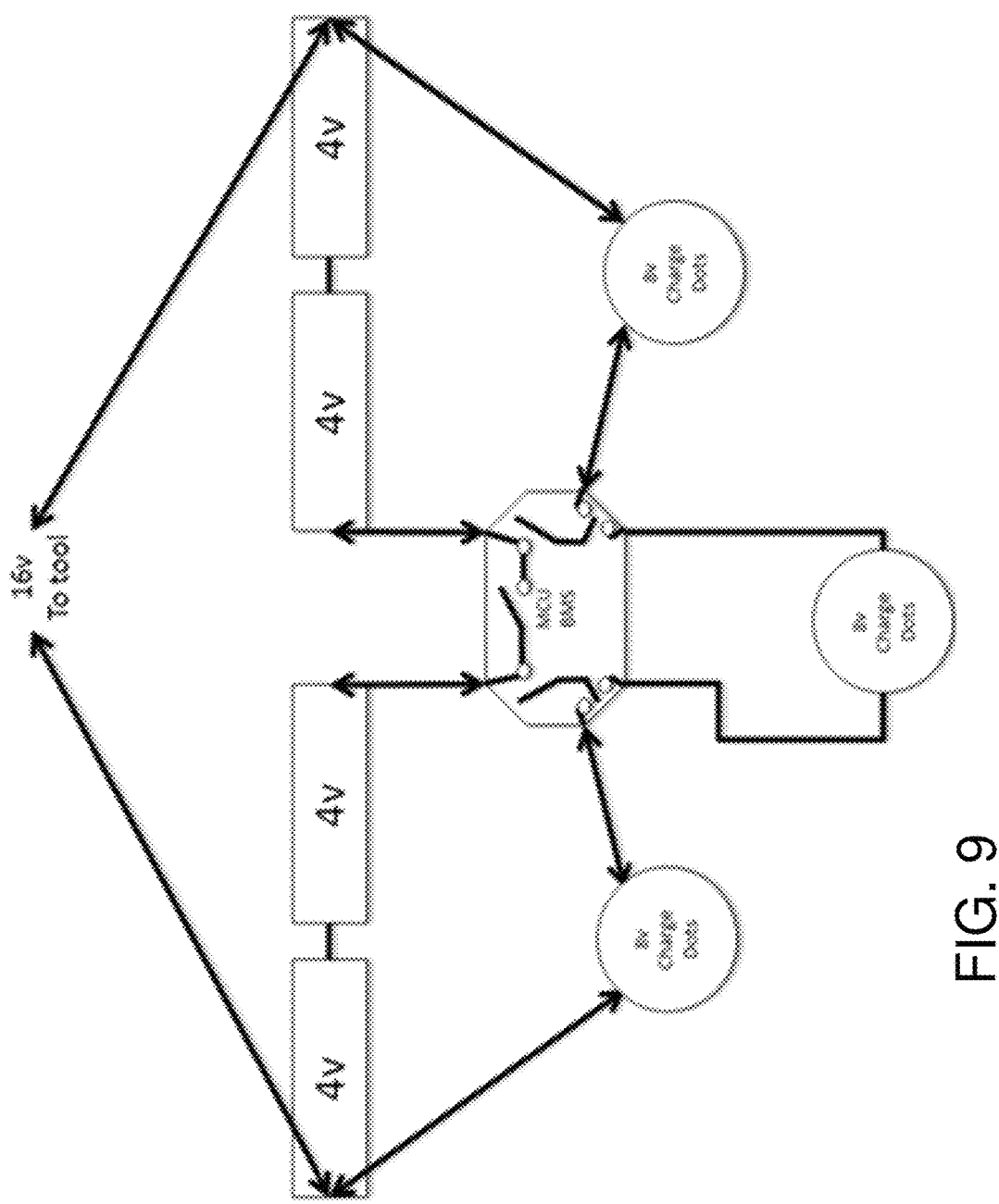
FIG. 9 is a block diagram of an exemplary battery charging system having two terminal constellations to split a charge voltage and one redundant terminal constellation, in accordance with a representative embodiment of the present disclosure.

FIG. 9 is a block diagram of an exemplary battery charging system having two terminal constellations to split a charge voltage and one redundant terminal constellation, in accordance with a representative embodiment of the present invention. As illustrated in FIG. 9, a first two sets of dots may be used to split the charge voltage and an additional set of redundant dots may effectively float where needed based on switching logic after the bridge rectifier.

Figure 10:
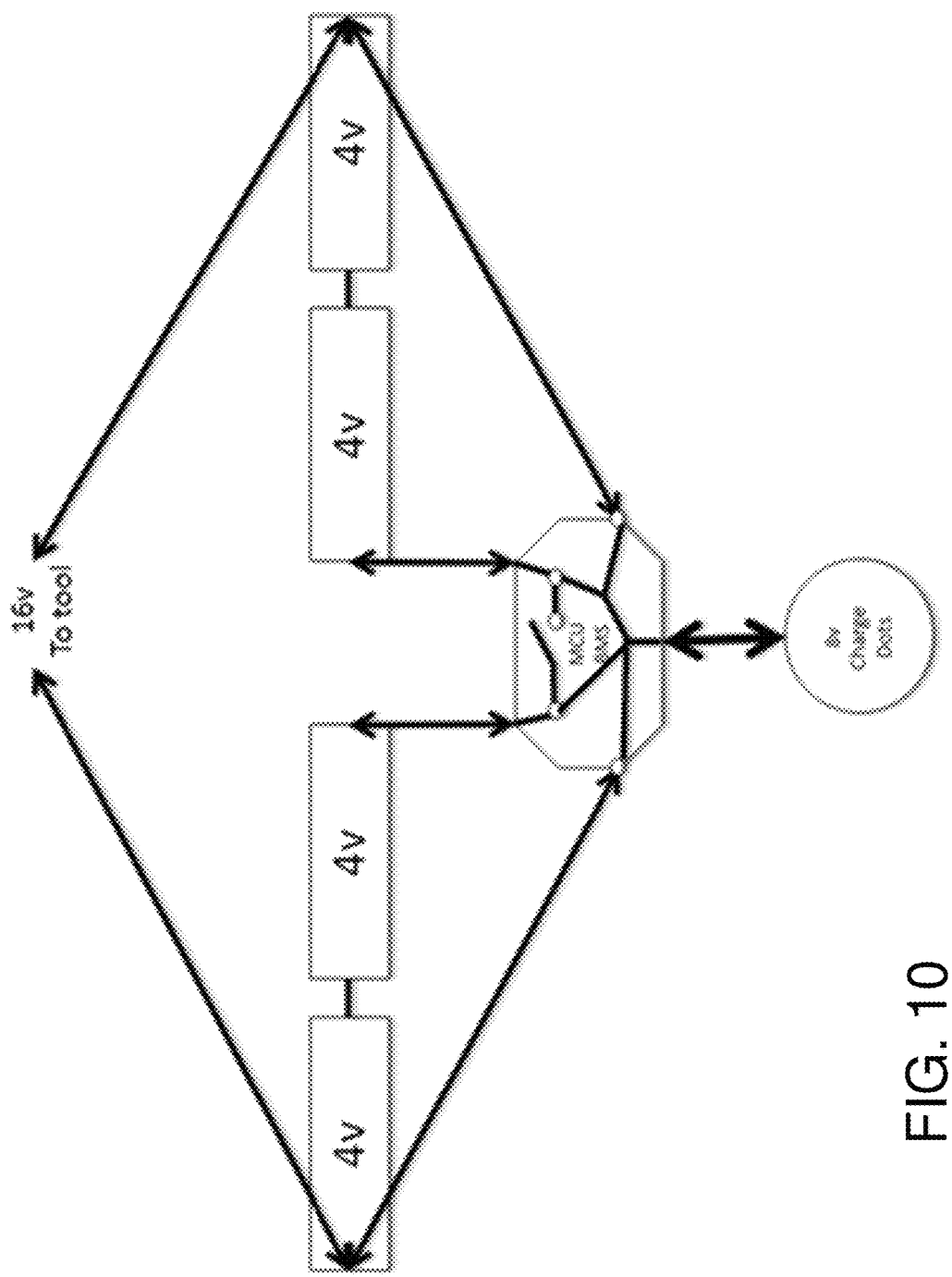
FIG. 10 is a block diagram of an exemplary battery charging system charging a battery pack having cells connected in series, in accordance with a representative embodiment of the present disclosure.

FIG. 10 is a block diagram of an exemplary battery charging system charging a battery pack having cells connected in series, in accordance with a representative embodiment of the present invention. Referring to FIG. 10, one set of dots performs the charging at substantially half the charging rate time based on the cells of the battery pack being charged in series.

Although certain embodiments may describe providing conductive charging with multiple terminal constellations in the context of a power tool, for example, unless so claimed, the scope of various aspects of the present invention should not be limited to power tools and may additionally and/or alternatively be applicable to any suitable device. For example, certain embodiments provide high voltage and/or high capacity use of constellation/dot style conductive charging for laptop computers, electric cars, or any suitable device.

Various embodiments provide charging a single battery and/or device such as a power tool using multiple terminal constellations (also referred to as multiple dot sets). In certain embodiments, a plurality of dot sets may create redundancy from a contact standpoint. If one dot set (e.g., 4 contact points or a plurality of contact points) is not making full contact and providing input to the four-way bridge rectifier or a plurality of bridge rectifiers, the microcontroller unit may switch to a redundant set of dots.

Aspects of the present invention provide a method of minimizing voltage at the contact points by splitting the voltage substantially in half in the case of a 16V battery pack splitting the voltage in half with two sets of dots, for example. This method may be with higher voltage packs (e.g., 60V packs etc.).

In certain embodiments, the voltage is minimized at the contact points by splitting the voltage and one or more additional redundant set of dots for each pair of dots that have already split the voltage may be implemented.

In an exemplary embodiment, one additional set of redundant dots may be determined with a logic switch as to which split voltage dot set is in need of redundancy.

In various embodiments, a 16V or any suitable voltage battery pack may be charged at a rate of half (e.g., 8V) or even lower. Although this solution would prove less complex, the charge time would essentially double because of limiting the charge rate. Although the charge rate is being reduced, the discharge rate of the battery pack is not affected.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A battery charging system comprising:
   a pad having a plurality of electrodes; and
   a device comprising:
   a plurality of terminal constellations comprising a primary terminal constellation set and a secondary redundant terminal constellation set, each of the plurality of terminal constellations comprising a pattern of contact points;
   a switch configured to select one of the plurality of terminal constellations from which charge signals are received;
   a rectifier configured to receive the charge signals and generate a power signal output;
   a microcontroller unit coupled to the switch and the rectifier, the microcontroller unit configured to determine whether the charge signals received at the rectifier corresponding with one of the primary terminal constellation set and the secondary redundant constellation set are operational, wherein if the charge signals provided by the primary terminal constellation set are not operational, the microcontroller unit controls the switch to receive charging signals from the secondary redundant terminal constellation; and
   one or more rechargeable battery cells configured to charge in response to receiving the power signal output.

2. The battery charging system of claim 1, comprising a power supply, wherein the pad is configured to receive power from the power supply.

3. The battery charging system of claim 1, wherein the rectifier is configured to receive the charge signals having an unknown polarity and to generate the power signal output having a desired polarity.

4. The battery charging system of claim 1, wherein the rectifier is a four-way bridge rectifier.

5. The battery charging system of claim 1, comprising a regulator configured to regulate the power signal output provided to the one or more rechargeable battery cells.

6. The battery charging system of claim 1, wherein at least a portion of the pattern of contact points of one or more of the plurality of terminal constellations provides a direct electrical connection to a portion of the electrodes of the pad if the plurality of terminal constellations is placed on a charging surface of the pad.

7. The battery charging system of claim 1, wherein if the charge signals provided by the primary terminal constellation set and the secondary terminal constellation set are not operational, the microcontroller unit provides an error indication, wherein the error indication is one or more of:
   illumination of an error light,
   providing an alarm sound, and
   displaying an error message.

8. A method of charging one or more rechargeable battery cells, the method comprising:
   selecting, by a switch of a rechargeable device, one of a plurality of terminal constellations of the rechargeable device from which charge signals are received, wherein the plurality of terminal constellations comprises a primary terminal constellation set and a secondary redundant terminal constellation set, each of the plurality of terminal constellations comprising a pattern of contact points;
   receiving, by a rectifier, the charge signals;
   determining, by a microcontroller unit coupled to the switch and the rectifier, whether the charge signals received at the rectifier corresponding with one of the primary terminal constellation set and the secondary redundant constellation set are operational,
   controlling, by the microcontroller, the switch to receive charging signals from the secondary redundant terminal constellation if the charge signals provided by the primary terminal constellation set are not operational;
   generating, by the rectifier, a power signal output from the charge signals; and
   charging the one or more rechargeable battery cells by the power signal output.

9. The method of claim 8, comprising receiving power from a power supply at a pad having a plurality of electrodes.

10. The method of claim 9, comprising providing a direct electrical connection between at least a portion of the pattern of contact points of one or more of the plurality of terminal constellations and a portion of the electrodes of the pad if the plurality of terminal constellations is placed on a charging surface of the pad.

11. The method of claim 8, wherein the receiving the charge signals and the generating the power signal output from the charge signals comprises receiving the charge signals having an unknown polarity and generating the power signal output having a desired polarity.

12. The method of claim 8, comprising regulating, by a regulator, the power signal output provided to the one or more rechargeable battery cells.

13. The method of claim 8, comprising providing, by the microcontroller unit, an error indication if the charge signals provided by the primary terminal constellation set and the secondary terminal constellation set are not operational, wherein the error indication is one or more of:
- illumination of an error light,
- providing an alarm sound, and
- displaying an error message.

14. A battery charging system comprising:
a device comprising:
a battery having a plurality of cells divided into a plurality of groups of cells, the plurality of groups of cells comprising a first group of cells detachably coupled to a second group of cells;
a plurality of terminal constellations, wherein each of the plurality of terminal constellations corresponds with one of the plurality of groups of cells of the battery, each of the plurality of terminal constellations comprising a pattern of contact points;
a switch configured to:
decouple the first group of cells from the second group of cells if the battery is in a charging mode, and
couple the first group of cells to the second group of cells if the battery is in a discharging mode; and
a microcontroller unit configured to control the switching of the switch between the charging mode and the discharging mode.

15. The battery charging system of claim 14, comprising:
a power supply, and
a pad having a plurality of electrodes, wherein the pad is configured to receive power from the power supply.

16. The battery charging system of claim 15, wherein at least a portion of the pattern of contact points of one or more of the plurality of terminal constellations provides a direct electrical connection to a portion of the electrodes of the pad if the plurality of terminal constellations is placed on a charging surface of the pad such that each of the plurality of terminal constellations provides charging signals.

17. The battery charging system of claim 16, comprising a rectifier configured to receive the charge signals having an unknown polarity from each of the plurality of terminal constellations to generate a corresponding power signal output having a desired polarity.

18. The battery charging system of claim 17, wherein the rectifier is a four-way bridge rectifier.

19. The battery charging system of claim 17, comprising a regulator configured to regulate each of the power signal outputs received from the rectifier and to provide regulated outputs to each of the plurality of groups of cells of the battery.

* * * * *